United States Patent [19]

Brei et al.

[11] 4,384,769

[45] May 24, 1983

[54] ILLUMINATING SYSTEM FOR TEST PROJECTOR

[75] Inventors: Vaclav Brei, Bad Münster-Ebernburg; Gerhard Hohberg, Irgisen, both of Fed. Rep. of Germany

[73] Assignee: Jos. Schneider Optische Werke Aktiengesellschaft, Bad Kreuznach, Fed. Rep. of Germany

[21] Appl. No.: 376,220

[22] Filed: May 7, 1982

[30] Foreign Application Priority Data

May 8, 1981 [DE] Fed. Rep. of Germany ....... 3118249

[51] Int. Cl.³ ............................................. G03B 21/00
[52] U.S. Cl. ...................................... 353/31; 353/122; 353/84; 362/231; 358/10; 350/174
[58] Field of Search ...................... 353/31, 32, 37, 122; 362/231, 228; 358/10, 48, 41; 356/30, 236; 350/174

[56] References Cited

U.S. PATENT DOCUMENTS

| | | | |
|---|---|---|---|
| 2,342,115 | 2/1944 | Blauvelt | 350/174 X |
| 2,589,569 | 3/1952 | Peter et al. | 362/231 X |
| 3,327,583 | 6/1967 | Vanderschmidt et al. | 356/236 X |
| 3,794,424 | 2/1974 | Eickhorst et al. | 356/30 |
| 4,237,475 | 12/1980 | Sekiguchi | 358/10 |
| 4,308,551 | 12/1981 | Ohnuma et al. | 358/10 |

Primary Examiner—John W. Shepperd
Assistant Examiner—William R. Sharp
Attorney, Agent, or Firm—Karl F. Ross

[57] ABSTRACT

A generator of polychromatic light for a projector of a multicolor image, e.g. as used in the testing of a color-television camera, comprises a spherical mixing chamber with three inlet apertures angularly equispaced about an outlet aperture spanned by a transparent test pattern and with a light-diffusing inner wall surface designed to emit a blend of several color components radiated into it from respective sources. A projection objective juxtaposed with the outlet aperture defines with that aperture and with its own entrance pupil a light cone determining a concave illuminating area of circular outline on the chamber wall; the differently colored light beams radiated into the chamber impinge upon limited wall zones offset from this illuminating area in order to homogenize the outgoing polychromatic beam. The luminous intensity of the outgoing beam is stabilized by a control of the light emission from each source with the aid of photodetectors individually irradiated by these sources or of a single photodetector receiving light reflected from the interior of the chamber.

10 Claims, 7 Drawing Figures

ILLUMINATING SYSTEM FOR TEST PROJECTOR

FIELD OF THE INVENTION

Our present invention relates to a system for the illumination of a projector of colored images, e. g. to a generator of polychromatic light enabling the projection of a multicolor pattern used for the testing of a color-television camera.

BACKGROUND OF THE INVENTION

Color-television pictures are generally taken with a camera comprising respective tubes for the several color components, usually three tubes for the primary colors red, green and blue. These tubes may be individually adjusted for the purpose of yielding a well-balanced color picture, such adjustment being performed automatically with the aid of a multicolor test pattern whose color components are separately fed to the respective tubes. For this purpose it is necessary to dispose of a source of polychromatic light which either transluminates the test pattern or is episcopically reflected therefrom before being split into components of different wavelengths.

It has already been proposed, as described in U.S. Pat. No. 4,237,475, to synthesize the beam for the illumination of the test pattern from two or three differently colored ray bundles whose intensity can be individually adjusted in conformity with the desired color composition. The combination of the contributing ray bundles into a composite beam is carried out in a mixing device not described in detail in the patent.

Devices for additively or subtractively combining light rays of different colors are, of course, well known in the art. More often than not, however, light beams emitted by such devices lack the homogeneity which is needed for the proper adjustment of a color-television camera. The polychromatic beam required for the purpose here primarily contemplated should generally have a color composition varying by not more than 2% from its axis to its periphery. With conventional light mixers the deviation may be locally as high as 5% to 10%; proper uniformization necessitates in such a case the use of a complex and correspondingly expensive projection objective.

Another problem encountered with conventional illumination systems, especially those in which differently colored beams are emitted by sources in the form of incandescent lamps, resides in the lack of constancy of the relative and absolute intensity of the several color components due to warm-up of the filaments as well as to extraneous influences. The resulting variations in the measured parameters, occurring during a test period of only a few minutes, may lead to an incorrect setting of the camera controls.

OBJECTS OF THE INVENTION

The general object of our present invention, therefore, is to provide an improved generator of polychromatic light for the purpose described, or for similar purposes, which emits a composite beam of virtually uniform color composition throughout its cross-section.

Another object is to provide means in such a generator for maintaining both the absolute and the relative intensity of the several color components constant throughout a test operation and for selectively changeable brightness levels. A further object is to provide a device for the purpose described which is of compact structure and low weight, suitable for installation in the housing of a television camera.

SUMMARY OF THE INVENTION

A polychromatic-light generator according to our invention comprises a plurality of radiant sources emitting light rays of different colors, these sources irradiating respective inlet apertures of a mixing chamber which is provided with a light-diffusing inner wall surface and which further has an outlet aperture for emitting an outgoing beam blended from the color components of the incoming beams. A projection objective operatively aligned with the outlet aperture and with a multicolor pattern, preferably one to be transluminated, has an entrance pupil defining with the outlet aperture an illuminating area of the wall surface of the mixing chamber from which the outgoing beam originates, the several sources being so oriented with reference to the inlet apertures that their incoming beams impinge upon limited zones of this wall surface that are offset from the illuminating area as well as from the outlet aperture.

Pursuant to a more particular feature of our invention, the wall surface of the mixing chamber is spherical and its inlet apertures are angularly equispaced about a ring segment concentric with its outlet aperture. A mixing chamber of this general description, giving rise to multiple internal reflections of the incident light, is known in the art as an Ulbricht chamber.

Pursuant to another feature of our invention, the light sources are provided with respective control means for stabilizing the luminous intensity of the incoming beams, e. g. electrically (as with the aid of shunt or series resistors in the manner described in the aforementioned U.S. Pat. No. 4,237,475) or optically, as by means of iris diaphragms, gray wedges or the like. The control means, which ought to be manually switchable before or even during a test, may further include individual photodetectors illuminated by light rays from the respective sources or a common photodetector disposed at an ancillary outlet of the mixing chamber for illumination by light reflected from its inner wall.

BRIEF DESCRIPTION OF THE DRAWING

The above other features of our invention will now be described in detail with reference to the accompanying drawing in which.

SPECIFIC DESCRIPTION

Figure 1:
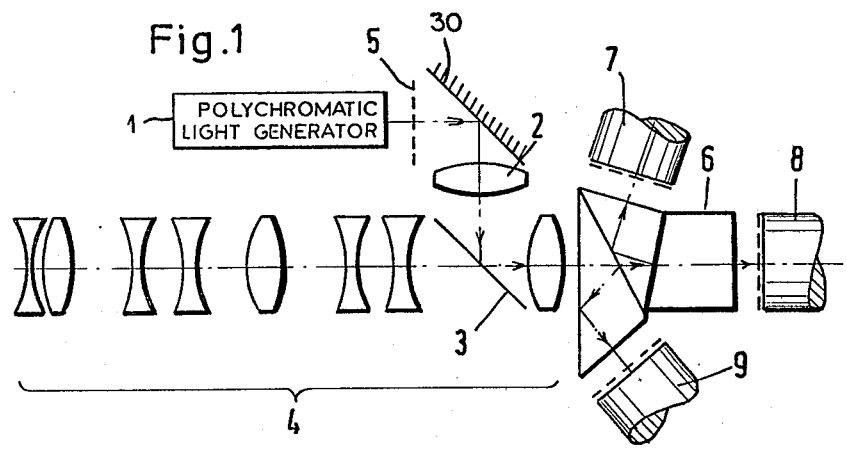
FIG. 1 diagrammatically illustrates a test projector embodying our invention.

In FIG. 1 we have shown an otherwise conventional test projector provided with a polychromatic light generator 1, more fully described hereinafter, which transluminates a multicolor transparency 5. The light rays of generator 1, deflected by a mirror 30, pass via an ancillary projection objective (shown simply as a condenser lens) and a semireflector 3 to the last stage of a varifocal main objective 4 aligned with a prism assembly 6 splitting the polychromatic beam into its three primary color components; the individual beams of predominantly red, green and blue chrominance are projected upon the photocathodes of respective image tubes 7, 8 and 9 forming part of a television camera not further illustrated.

The test pattern carried by transparency 5 is used in the known manner to adjust the contributions of the several image tubes 7,8 and 9 to the transmitted picture. When adjustments have been completed and generator 1 is turned off, objective 4 projects upon the several photocathodes (via chromatic separator 6) the scenes to be televised.

Figure 2:
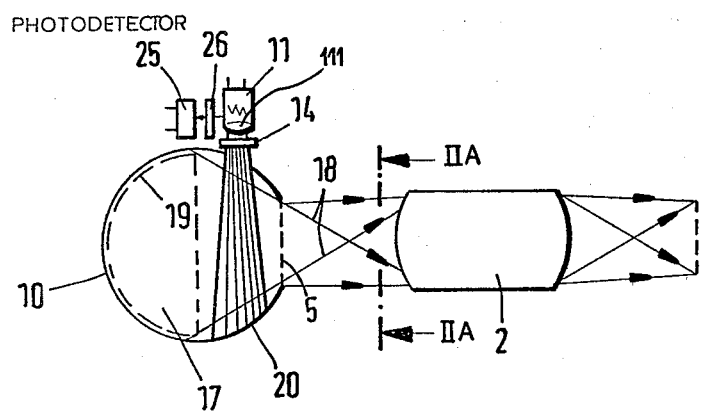
FIG. 2 is a somewhat schematic cross-sectional view of a mixing chamber included in the test projector of FIG.
Figure 2A:
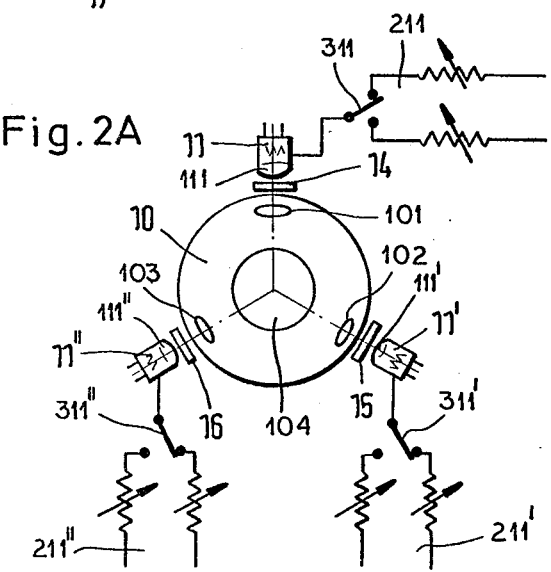
FIG. 2A is an axial view taken on the line IIA—IIA of FIG. 2.
Figure 3:
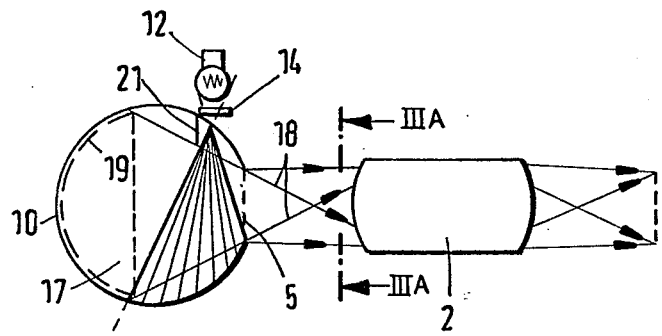
FIG. 3 is a view similar to FIG. 2, illustrating a modification.
Figure 3A:
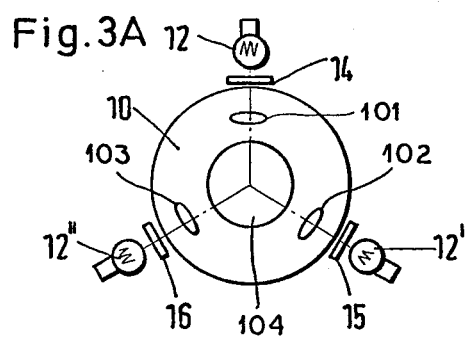
FIG. 3A is an axial view taken on the line IIIA—IIIA of FIG. 3.
Figure 4:
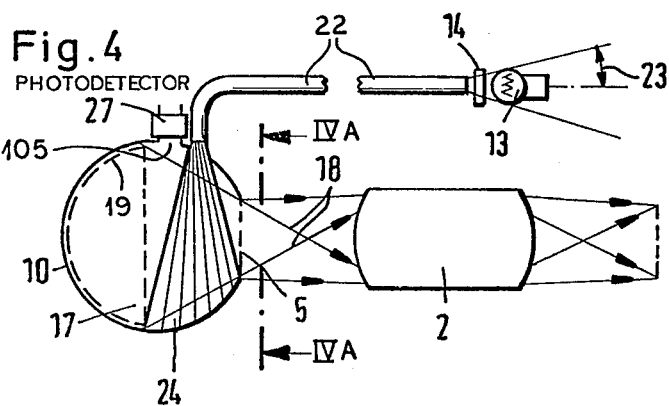
FIG. 4 is another view similar to FIG. 2, illustrating a further modification.

The light generator 1 shown in FIG. 1 comprises, as illustrated in FIGS. 2-4, a mixing chamber 10 in the form of a hollow sphere with a white inner wall surface of light-diffusing character. Chamber 10 has three inlet apertures 101, 102 and 103, best seen in FIGS. 2A and 3A, as well as an outlet aperture 104 which is spanned by the transparency 5 to be transluminated. Aperture 104 is optically in line, with or without interposition of one or more reflectors such as the mirror 30 of FIG. 1, with the ancillary projection objective 2 whose entrance pupil defines with that aperture a generally conical field of view 17 bounded by limiting rays 18. The projection of field 17 upon the inner wall surface of chamber 10 is an approximately hemispherical area 19 referred to hereinafter as the illuminating area. The main objective 4 has been omitted in FIGS. 2-4.

The light generator 1 of FIG. 1 further comprises three light sources indicated at 11, 11' and 11" in FIGS. 2 and 2A, each of these sources being shown as an incandescent lamp with a built-in or juxtaposed condenser lens 111, 111' and 111" focusing the emitted light into an incoming beam 20 trained upon a limited zone of the inner chamber wall, as particularly illustrated in FIG. 2 for the lamp 11. The zones respectively irradiated by the three light sources lie all outside the illuminating area 19, namely in a relatively narrow ring segment of the sphere bounded by that area and by the outlet aperture 104 whose diameter is shown to be between one-half and one-quarter that of the inner chamber surface. Inlet apertures 101, 102 and 103 are disposed in the same ring segment opposite the zones irradiated thereby; with this arrangement, outlet aperture 104 acts as a lambertian source delivering a substantially homogeneous flux.

The incoming beams emitted by sources 11, 11' and 11" pass through respective filters 14, 15 and 16 transmitting only the three primary colors red, green and blue. The intensity or luminance of each color component can be varied by electrical or optical means, symbolized in FIG. 2A by respective networks 211, 211', 211" connected to the respective lamp filaments. Each network, as illustrated, includes a manual switch 311, 311', 311" for the selective insertion of one of several resistors which are automatically adjustable under the control of individual photodetectors juxtaposed with the respective light sources, one such photodetector assigned to lamp 11 having been shown at 25 in FIG. 2. With switches 311, 311', 311" ganged for joint operation, the user may select one of several brightness levels without altering the chromatic composition of the outgoing beam. An infrared filter 26 interposed between lamp 11 and photodetector 25 protects the latter from excessive radiant heat. Alternatively, as illustrated in FIG. 4, the overall intensity of the light reradiated by chamber 10 may be monitored by a photodetector 27, juxtaposed with an ancillary outlet aperture 105 offset from the irradiated zones and from area 19, which controls the emission of luminous energy from each light source.

In the modified arrangement of FIGS. 3 and 3A we have replaced the lens-carrying lamps 11, 11', 11" of the preceding embodiment by simple lamps 12, 12', 12" so spaced from their associated inlet apertures as to limit the region irradiated thereby to a ring segment spaced from illuminating area 19 as described above. An opaque shield 21 associated with each light source may further be disposed inside chamber 10 to prevent the emission of stray rays into area 19.

Figure 4A:
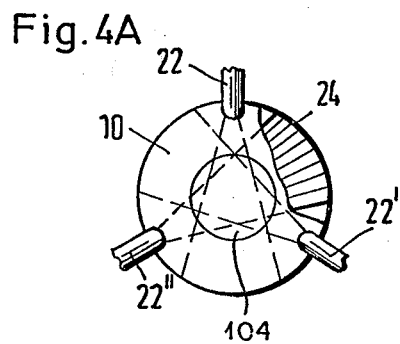
FIG. 4A is an axial view (partially broken away) taken on the line IVA—IVA of FIG. 4.

Finally, as illustrated in FIGS. 4 and 4A, lamps 13 (only one shown) can irradiate the interior of chamber 10 at the aforementioned limited zones via respective light conductors 22, 22' and 22" (e. g. bundles of optical fibers) terminating at the several inlet apertures. The necessary angular limitation of light cones 24 issuing from the exit ends of these light conductors is insured by so spacing the respective sources 13 from their entrance ends that the maximum angle of incidence, indicated at 23 in FIG. 4, corresponds to half the permissible vertex angle of cone 24.

The light generator according to our invention is highly compact and, owing to the use of a hollow sphere 10 as its principal constituent, of very low weight. Naturally, compatible features of the specifically disclosed embodiments can be used jointly or interchangeably; thus, for example, the radiation shields 21 of FIG. 3 may also be combined with the light sources of FIGS. 2 and 4. The manually switchable and automatically adjustable resistors of networks 211, 211', 211" (FIG. 2A) are representative of both electrical and optical control means as mentioned hereinabove.

We claim:

1. A generator of polychromatic light for a projector of multicolor images comprising:

a plurality of radiant sources emitting light rays of different colors;

a mixing chamber having a plurality of inlet apertures respectively irradiated by said sources with incoming beams of said different colors, said chamber being provided with a light-diffusing inner wall surface and further having an outlet aperture for emitting an outgoing beam of polychromatic light blended from the color components of said incoming beams; and a projection objective operatively aligned with said outlet aperture and with a multicolor pattern whose image is to be projected upon a receiving surface, said objective having an entrance pupil defining with said outlet aperture an illuminating area of said wall surface from which said outgoing beam originates, said sources being so oriented with reference to said inlet apertures that said incoming beams impinge upon limited zones of said wall surface offset from said illuminating area and from said outlet aperture.

2. A generator as defined in claim 1 wherein said wall surface is spherical, said inlet apertures being angularly equispaced about a ring segment concentric with said outlet aperture.

3. A generator as defined in claim 1 or 2 wherein said pattern is a transparency spanning said outlet aperture.

4. A generator as defined in claim 1 or 2 wherein said sources are provided with focusing means training said incoming beams upon said limited zones.

5. A generator as defined in claim 1 or 2 wherein said chamber is provided with shield means screening said illumination area from said incoming beams.

6. A generator as defined in claim 1 or 2 wherein said sources comprise light conductors having entrance ends juxtaposed with respective radiators and exit ends disposed at said inlet apertures.

7. A generator as defined in claim 6 wherein said radiators illuminate said entrance ends with maximum angles of incidence corresponding to half the vertex angle of a cone of light rays originating at said exit ends and striking said wall surface at the boundaries of said limited zones.

8. A generator as defined in claim 1 or 2 wherein said sources are provided with respective control means for stabilizing the luminous intensity of said incoming beams.

9. A generator as defined in claim 8 wherein said control means include individual photodetectors illuminated by light rays from the respective sources.

10. A generator as defined in claim 8 wherein said control means include a common photodetector disposed at an ancillary outlet of said chamber for illumination by reflected light.

* * * * *